Oct. 1, 1957  O. W. MORRIS  2,807,874
METHOD FOR MAKING BOBBINS
Filed June 9, 1954

INVENTOR.
ONA W. MORRIS
BY
C. D. O'Brien
T. L. Styner
ATTYS.

United States Patent Office 2,807,874
Patented Oct. 1, 1957

2,807,874

METHOD FOR MAKING BOBBINS

Ona W. Morris, Indianapolis, Ind.

Application June 9, 1954, Serial No. 435,651

8 Claims. (Cl. 29—414)

(Granted under Title 35, U. S. Code (1952), sec. 266)

The invention described herein may be manufactured and used by or for the Government of the United States of America for governmental purposes without the payment of any royalties thereon or therefor.

This invention relates to a method for making annularly shaped bobbins, and more particularly to a method for making bobbins of relatively large diameter and relatively small circular cross-section with a groove therein extending throughout the periphery thereof to receive wire for the winding of toroidal coils.

Heretofore annular bobbins of this sort were made from tubing having slightly larger diameter than that of the completed bobbins and having wall thickness somewhat greater than the diameter of the small circular cross-section of the desired bobbin. In making each bobbin in this manner, the tubing was mounted on a lathe, and numerous machining operations were performed on an end portion of said tubing to provide a toroidal cavity therein opening outwardly by means of a kerf or slot throughout its periphery and to convert the exterior of said end portion containing said toroidal cavity to an annular portion of substantially circular cross-section. The annular portion was then cut off to form an annulus and further machining operations were performed on the surface thereof to provide a uniform exterior radius of curvature throughout the circumference of said cross-section. In practice these machining operations are found to be quite difficult and time consuming because of the minuteness of the cross section compared with the diameter of the annulus. Also in known bobbins of this type the joint which occurs at a point of discontinuity along the circumference of the annulus and which permits its being interlinked with the toroidal core to be wound has been found unsatisfactory in that much time was consumed in hand filing the joint to obtain the required precision, and this precision is soon lost because of wear at the joint due to flexing of the annulus causing breakage of the wire being wound and necessitating tedious repair of the joint or replacement of the annulus.

The present invention obviates these difficulties by fabricating the bobbin from tubing of circular cross-section the diameter of which is the same as that of the cross-section of the completed bobbin to form an annulus the diameter of which is that of the completed bobbin. The annulus is provided with a kerf extending throughout its periphery, with accurately machined interengaging ends held in juxtaposition, and with an open sided sleeve slidably telescoping with the interengaging ends.

These bobbins are made by winding the tubing on an arbor of suitable size to form a helical coil; cutting the helical kerf having a pitch equal to that of the coil in the periphery thereof; removing the helical coil from the arbor and cutting it by any suitable method into helical sections of somewhat more than 360° extent; using guide surfaces on the ends of a chucking device, in which the helical section may be clamped, to cut on the ends thereof grooves bounded by plane surfaces to maintain the ends of the completed annulus in accurate alignment; and slidably telescoping into the ends of the annulus short arcuate segments of open-sided sleeves made from smaller tubing in substantially the same manner as the aforesaid helical sections.

A general object of the present invention is to provide bobbins for use in winding toroidal coils and to provide the method of making the bobbins, which are annular in shape and substantially circular in cross-section, which have accurately machined interengaging ends reinforced by sleeve means to provide a strong and durable joint and structure throughout, and which may be easily and inexpensively manufactured.

Other objects and many of the attendant advantages of this invention will be readily appreciated as the same becomes better understood by reference to the following detailed description when considered in connection with the accompanying drawing wherein.

Figure 1:
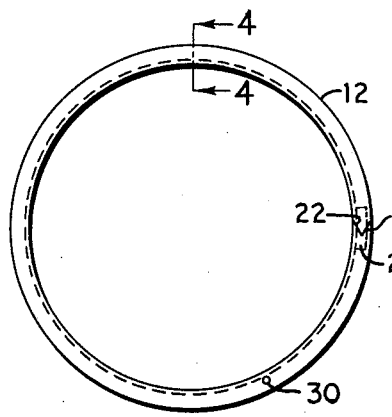
Fig. 1 is a side view of the bobbin.
Figure 2:
Fig. 2 is a view of the bobbin taken looking toward it from the right of Fig. 1.
Figure 3:
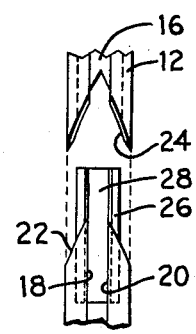
Fig. 3 is an enlarged partial view of the reinforced joint between the ends of the bobbin shown in Figs. 1 and 2.

Referring now to the drawings, attention is directed to Figs. 1 to 4, inclusive. The bobbin is comprised chiefly of a tube-like annulus 12 containing therein a wire receiving toroidal cavity 14 which opens outwardly by means of a slot or kerf 16 extending throughout the periphery of the annulus. The edges 18 and 20 of slot or kerf 16 are rounded to prevent damage to wire during the winding or unwinding operation to or from the bobbin. Annulus 12 is provided with ends 22 and 24 which normally are held in juxtaposition but which may be separated to permit inter-linking the bobbin with the toroidal core upon which the wire is ultimately to be wound. It is necessary in order to prevent breakage or damage to the wire that the joint occurring between ends 22 and 24 be quite accurately machined and fitted. Ends 22 and 24 each consist of four plane surfaces intersecting to form dihedral angles. For each plane surface on end 22 there is on end 24 a corresponding, congruent mating plane surface. Likewise for each dihedral angle on end 22 there is on end 24 a corresponding, complementary, mating, dihedral angle. When ends 22 and 24 are placed in juxtaposition, therefore, the corresponding plane surfaces and the corresponding dihedral angles on ends 22 and 24 are closely engaged to form a closely fitting joint, which is obtained by a procedure described hereinafter.

In order to reinforce the joint between ends 22 and 24 a short arcuate segment of sleeve 26 having an open side 28 is secured in one of the ends, herein illustrated as end 22. End 24 slidably telescopes with the exposed end of open-sided sleeve 26 to permit annulus 12 to be interlinked with a toroidal core which is to be wound. End 22 is urged against end 24 by an inherent radially inwardly compressive force within the annulus obtained in a manner described hereinafter.

In order to secure one end of the wire to the annulus 12 for winding it thereon, a hole 30 is provided at a point approximately 60° along the circumference from ends 22 and 24.

In utilizing the bobbin in winding a coil on a toroidal core, ends 22 and 24 are separated and interlinked with the toroidal core (not shown). In use, one end of the wire to be wound on the toroidal core is inserted through hole 30 via toroidal cavity 14 and secured by any suitable means to the exterior of annulus 12. The bobbin is then filled by rotating it about its axis on a machine provided for this purpose (not shown). The wire is then severed and attached to the toroidal core, and the bobbin is rotated on the above mentioned machine to place the winding on the core.

Figure 5:
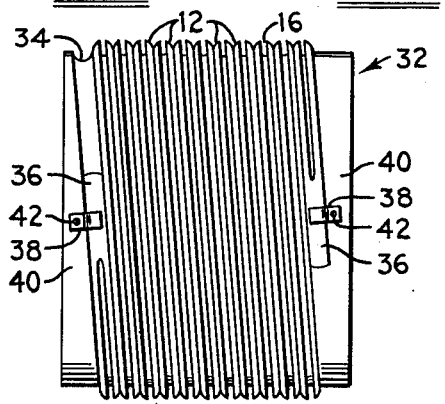
Fig. 5 is an elevational view of the arbor used in making the bobbin with the tubing coiled thereon.
Figure 4:
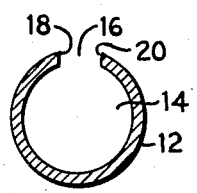
Fig. 4 is an enlarged cross-sectional view taken on line 4—4 of Fig. 1.

Referring more particularly to Fig. 5, the annulus 12 is fabricated by winding tubing made from resilient material, such as stainless steel, of suitable diameter upon an arbor 32 of generally cylindrical contour upon which has been turned a helical groove 34 which is cut in the manner used in cutting screw threads. The tubing is wound in groove 34 to form a plurality of annuli 12. The ends of the tubing generally referred to by the reference character 36 are secured to the surface of arbor 32 by means of brackets 38 fastened to the cylindrical surface 40 of the arbor 32 by means of screws 42. Slot or kerf 16 is cut in the tubing by means of a parting tool or like cutting device run on the same pitch and in the same manner as that used for cutting the helical groove 34 in the arbor. The edges 18, 20 (Fig. 4) of kerf 16 are smoothed by filing or any other suitable method. In forming the helix and the slot therein as herein set forth, it is seen that a plurality of annuli of the desired circumferential extent may be formed in one winding operation and one slot or kerf cutting operation.

The helical coil is removed from arbor 32 and cut by means of a saw into helical sections of slightly more than 360° of circumferential extent. Each of these helical sections is used in making an annulus 12 to form the body of the bobbin.

Each open sided-sleeve 26 may also be made from tubing by substantially the same procedure as that for making each annulus 12. The external diameter of the tubing is chosen to be approximately equal to the internal diameter of that used for making annulus 12. The tubing is likewise wound in groove 34 on arbor 32 and the same parting tool is used in providing the open side in sleeve 26. In this manner it is assured that the slots or kerfs 28 in sleeve 26 and annulus 12 will be laterally coextensive. The helical coil of the smaller tubing is removed from arbor 32 and cut by means of a saw into arcuate segments of suitable length.

Figure 7:
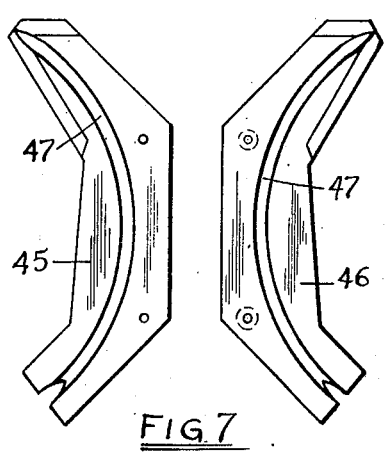
Figure 7 is a view showing the inside surfaces of two halves of a chucking device.
Figures 6, 8:
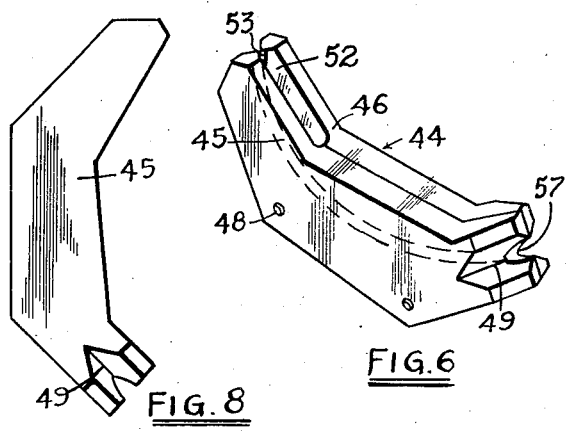
Fig. 6 is a perspective view of a chucking device used in forming the joint between the ends of the bobbin.
Figure 8 is a view showing the outside surafce of one of the two halves shown in Figure 7.

Referring more particularly to Figs. 6 to 8, inclusive, the particular contour of mating ends 22 and 24 is obtained by cutting these ends with annulus 12 clamped in a chucking device 44 having two mating halves 45 and 46. Each half has a semi-circular groove 47. Annulus 12 is positioned in these grooves and the two halves are fastened together by means of screws 48. Angular grooves 49 and 51 serve as a cutting guide in contouring end 22, and angular grooves 52 and 53 serve as a guide in contouring end 24. The angular extent and orientation of the grooves are so related that the resulting contours formed on ends 22 and 24 are complementary when placed in juxtaposition. To prevent damage to the guide surfaces by the cutting operation the chucking device is made from tool steel and hardened to such an extent that the cutting tool is incapable under ordinary usage of removing metal from these surfaces. By utilizing this chucking device in shaping the ends of annulus 12 much tedious and time consuming trial-and-error cutting is eliminated.

One end of open-sided sleeve 26 is inserted in end 22, for example, of annulus 12 (Fig. 3) and secured thereto by soldering, brazing, or by any other suitable means. Since the annulus is of somewhat more than 360° in circumferential extent and is fabricated from resilient material, by spreading the ends apart circumferentially and by permitting the inherent radially inwardly directed compressive force in the annulus to bring its open end into slidable telescoping relationship with the exposed end of the open-sided sleeve, the mating plane surfaces on the ends of the annulus are held snugly in engagement. In this manner the joint between the ends of annulus 12 are reinforced. The open-sided sleeve co-operates with the closely fitted mating end surfaces to form a smooth, strong, stable and durable joint in annulus 12.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States of America is:

1. The method of making annular bobbins which comprises forming a first length of tubing into a helical coil by winding said tubing in a helical groove in a cylindrical arbor; cutting a helical kerf through the wall of said tubing substantially throughout the periphery of said helical coil and on the same pitch as that of said helical groove in said arbor; cutting the tubing into a plurality of helical sections of somewhat more than 360° of circumferential extent; cutting on the ends of each of said helical sections plane surfaces providing an interlocking joint between said ends when placed in juxtaposition to form an annulus; forming an open-sided sleeve from a second length of tubing of external diameter approximately equal to the internal diameter of said first length of tubing; and securing one end of said open-sided sleeve within one end of said annulus.

2. The method of making annular bobbins defined in claim 1, wherein said cutting of said plane surfaces on the ends of each helical section is performed by clamping the helical section in a chucking device having on each end thereof a plurality of V-shaped grooves, and cutting said mating plane surfaces utilizing said grooves as guides.

3. The method of making annual bobbins defined in claim 2, wherein said forming of said open-sided sleeve is accomplished by winding a plurality of turns of said second length of tubing in the helical groove of said arbor to form said tubing into a helical coil; cutting a helical kerf through the wall of said tubing substantially throughout the periphery of said helical coil and on the same pitch as that of said helical groove in said arbor; removing said helical coil formed from said second length of tubing from said arbor and cutting said coil into arcuate segments of sufficient length to span said interlocking joint when slidably telescoped in the ends of said annulus.

4. The method of making annual bobbins defined in claim 1, wherein said forming of said open-sided sleeve is accomplished by winding a plurality of turns of said second length of tubing in the helical groove of said arbor to form said tubing into a helical coil; cutting a kerf through the wall of said tubing substantially throughout the periphery of said helical coil and on the same pitch as that of said helical groove in said arbor; removing said helical coil formed from said second length of tubing from said arbor and cutting said coil into arcuate segments of sufficient length to span said interlocking joint when slidably telescoped in the ends of said annulus.

5. The method of making annual bobbins which comprises winding a plurality of turns of a first length of resilient tubing in a helical groove of uniform pitch on the surface of an arbor of generally cylindrical shape to form said tubing into a helical coil; cutting a helical kerf through the wall of said tubing substantially throughout the periphery of said helical coil, said kerf being cut on the same pitch as that of said helical groove on said arbor; removing said helical coil from the arbor and cutting the helical coil into a plurality of helical sections of somewhat more than 360° of circumferential extent; cutting on the ends of each section mating plane surfaces providing an interlocking joint between said ends when placed in juxtaposition to form an annulus; forming a short open-sided arcuate sleeve from a second length of tubing of external diameter approximately equal to the internal diameter of said first length of tubing; and slidably telescoping said sleeve into one end of said annulus and securing it thereto.

6. The method of making annual bobbins defined in claim 5, wherein said forming of said open-sided sleeve is accomplished by winding a plurality of turns of said second length of tubing in the helical groove of uniform pitch on the surface of said arbor to form said second length of tubing into a second helical coil; cutting a helical kerf through the wall of said tubing of said second helical coil substantially throughout the periphery thereof and on the same pitch as that of said helical groove in said arbor; removing from said arbor said second helical coil and cutting it into arcuate segments of sufficient length to span said interlocking joint.

7. The method of making annual bobbins defined in claim 6, wherein said cutting of said plane surfaces on the ends of each helical section is accomplished by clamping each helical section in a chucking device having on each end thereof a plurality of V-shaped grooves, and cutting said mating plane surfaces utilizing said grooves as guides.

8. The method of making annual bobbins defined in claim 5, wherein said cutting of said plane surfaces on the ends of each helical section is accomplished by clamping the helical section in a chucking device having on each end thereof a plurality of V-shaped grooves, and cutting said mating plane surfaces using said grooves as guides.

References Cited in the file of this patent

UNITED STATES PATENTS

| | | |
|---|---|---|
| 218,128 | Mersereau | Aug. 5, 1879 |
| 1,215,775 | Campbell | Feb. 13, 1917 |
| 1,973,436 | Hjort | Sept. 11, 1934 |
| 2,006,281 | Schwarz | June 25, 1935 |
| 2,021,572 | Wuerfel | Nov. 19, 1935 |
| 2,185,883 | Berger | Jan. 2, 1940 |
| 2,672,297 | Harder | Mar. 16, 1954 |